United States Patent [19]

Masuda

[11] Patent Number: 5,747,761
[45] Date of Patent: May 5, 1998

[54] MANUALLY RESETTABLE SHOCK SENSOR SWITCH

[75] Inventor: Soichiro Masuda, Toyota, Japan

[73] Assignee: Aisin Seiki Kabushiki Kaisha, Kariya, Japan

[21] Appl. No.: 722,823

[22] Filed: Sep. 27, 1996

[30] Foreign Application Priority Data

Sep. 29, 1995 [JP] Japan .................................. 7-253861

[51] Int. Cl.⁶ ............................................. H01H 35/14
[52] U.S. Cl. ............................. 200/61.45 R; 200/61.5
[58] Field of Search ...................... 200/61.45 R, 61.48, 200/61.49, 61.5, 61.51, 61.52, 61.53

[56] References Cited

U.S. PATENT DOCUMENTS

| | | | |
|---|---|---|---|
| 2,291,236 | 7/1942 | Kilgour | 200/61.5 |
| 3,621,163 | 11/1971 | Hitchcock | 200/61.45 R |
| 3,743,803 | 7/1973 | Roesch et al. | 200/61.5 X |
| 3,798,399 | 3/1974 | Corporandy | 200/61.45 X |
| 4,016,384 | 4/1977 | Lerow, Jr. et al. | 200/308 X |
| 4,278,856 | 7/1981 | Owens | 200/308 X |
| 4,326,111 | 4/1982 | Jackman | 200/61.5 X |
| 4,371,763 | 2/1983 | Jackman et al. | 200/61.45 R |
| 4,533,801 | 8/1985 | Jackman et al. | 200/61.45 R |
| 5,038,006 | 8/1991 | Lowe, Sr. et al. | 200/61.5 |

FOREIGN PATENT DOCUMENTS

| | | |
|---|---|---|
| 51-53077 | 6/1976 | Japan . |
| 83/02196 | 6/1983 | WIPO . |

*Primary Examiner*—J. R. Scott
*Attorney, Agent, or Firm*—Burns, Doane, Swecker & Mathis, LLP

[57] ABSTRACT

A shock sensor for vehicles is provided with a housing having a sloping bottom wall and a ball that can move up the sloping wall when a shock in excess of a certain level is applied. A supporting member pushes the ball towards the bottom end of the housing but is released from the ball upon the application of a shock in excess of a certain level. A movable electrode is mounted on the supporting member and is disconnected from a fixed electrode that is fixed within the housing during downward movement of the rod. This causes the electric current to be turned off. The connected state of the electrodes can be restored by pulling up a reset member.

18 Claims, 8 Drawing Sheets

MANUALLY RESETTABLE SHOCK SENSOR SWITCH

FIELD OF THE INVENTION

The present invention relates to a shock sensor and more particularly to a shock sensor used in conjunction with a fuel pump of a vehicle, or possibly another vehicle component, for determining the occurrence of a shock so that the fuel pump can be turned off to thereby prevent the delivery of fuel to the engine.

BACKGROUND OF THE INVENTION

A conventional shock sensor for sensing shocks in a vehicle to stop the supply of fuel to the engine is disclosed in Japanese Utility Model laid-open publication No. Sho 51-53077. This shock sensor includes a housing with a sloping wall and a ball which is usually stationarily positioned with respect to the sloping wall. A supporting member pushes the ball against the sloping wall when a shock is not applied. The shock sensor is designed so that the ball moves up the sloping wall when a shock greater than a certain level occurs.

The shock sensor also includes an electrode that is fixed in the housing, and movable electrodes that can contact the fixed electrode. The supporting member is in the form of a rod that is pushed upward by the ball when a shock greater than a certain level occurs. A spring is operatively associated with the rod for pushing or urging the rod against the ball and the outer periphery of the rod is provided with an engagement groove. The movable electrodes are connected with the fixed electrode in the absence of a shock greater than a certain level. The movable electrodes are urged towards the outer periphery of the rod by respective springs. When a shock greater than a predetermined level occurs, the ball moves away from the sloping wall. This allows the rod to move axially by virtue of the urging force of the associated spring. The rod assumes a position in which the movable electrodes engage the engagement groove on the periphery of the rod and so the movable electrodes become disconnected from the fixed electrode. This is the manner in which the shock sensor senses a shock.

The type of shock sensor described above permits a rod to move upward with the rolling movement of a ball so that the movable electrodes engage the groove in the rod, and the electric current between the movable and fixed electrodes is cut off. This construction requires that the rod be provided with an engagement groove around its outer periphery and also requires springs to push the movable electrodes against the rod. This of course increases the complexity of the sensor and requires additional manufacturing processes.

SUMMARY OF THE INVENTION

In light of the foregoing, a need exists for a shock sensor that can sense shocks, but which does not require the formation of a groove in the supporting member of the ball.

A need also exists for a shock sensor that does not require additional parts such as springs to push the movable electrodes against the rod.

According to one aspect of the present invention, a shock sensor includes a housing having a conically shaped bottom portion that converges to a bottom end, a ball positioned in the housing and movable along the conically shaped bottom portion of the housing when a shock exceeding a predetermined level is applied to the shock sensor, a supporting member movably mounted in the housing for pushing the ball against the bottom end of the conically shaped bottom portion of the housing in the absence of a shock exceeding the predetermined level, a fixed electrode, and a movable electrode. The movable electrode is connected to and movable with the supporting member so that with the supporting member in one position the fixed electrode and the movable electrode are connected to one another to define a connected state and with the supporting member in another position the fixed electrode and the movable electrode are disconnected from one another to define a disconnected state.

Since the shock sensor according to the present invention is constructed so that the movable electrode can be connected to and disconnected from the fixed electrode according to the position of the supporting member, it is not necessary to form an engagement groove in the supporting member and a shock can be sensed without using springs that push the movable electrodes against the rod. This reduces the number of parts required to manufacture the sensor as well as the cost associated with manufacturing the sensor.

According to another aspect of the invention, a shock sensor for sensing the occurrence of a shock that exceeds a predetermined level includes a housing having an interior partially bounded by a sloping bottom wall that converges to a bottom end and a ball disposed in the housing. The ball is positionable at the bottom end of the housing in the absence of a shock exceeding the predetermined level and moves away from the bottom end of the housing upon the occurrence of a shock exceeding the predetermined level. The sensor also includes a rod that is movably mounted in the housing in an axial direction of the rod, a fixed electrode mounted in the housing, and a movable electrode positioned in the housing. The movable electrode is connectable to the fixed electrode in the absence of a shock exceeding the predetermined level and is disconnectable from the fixed electrode upon the occurrence of a shock exceeding the predetermined level. A spring is operatively associated with both the rod and the movable electrode for urging the rod into engagement with the ball in the absence of a shock exceeding the predetermined level and for urging the movable electrode out of connection with the fixed electrode upon movement of the ball away from the bottom end in response to the occurrence of a shock exceeding the predetermined level.

In accordance with a further embodiment of the invention, a shock sensor for sensing the occurrence of a shock that exceeds a predetermined threshold includes a housing having a sloping bottom wall that converges to a bottom end, a ball positioned in the housing and movable away from the bottom end of the housing upon the occurrence of a shock exceeding the predetermined threshold, a supporting member movably mounted in the housing for pushing the ball against the bottom end of the housing in the absence of a shock exceeding the predetermined threshold, a fixed electrode fixed within the housing, and a movable electrode movably positioned within the housing. The movable electrode is movable between one position in which the fixed electrode and the movable electrode are connected to one another to define a connected state and another position in which the fixed electrode and the movable electrode are disconnected from one another to define a disconnected state. The sensor is also provided with a cap that is located at the upper end of the housing to enclose a space in which is located an end portion of the supporting member. The cap is made of at least partially transparent material so that the end portion of the supporting member is visually observable through the cap when the fixed electrode and the movable electrode are either in the connected state or the disconnected state.

3

BRIEF DESCRIPTION OF THE DRAWING FIGURES

The foregoing and additional features of the present invention will become more apparent from the following detailed description considered with reference to the attached drawing figures in which like elements are designated by like references numerals and wherein.

DETAILED DESCRIPTION OF THE INVENTION

Figure 1:
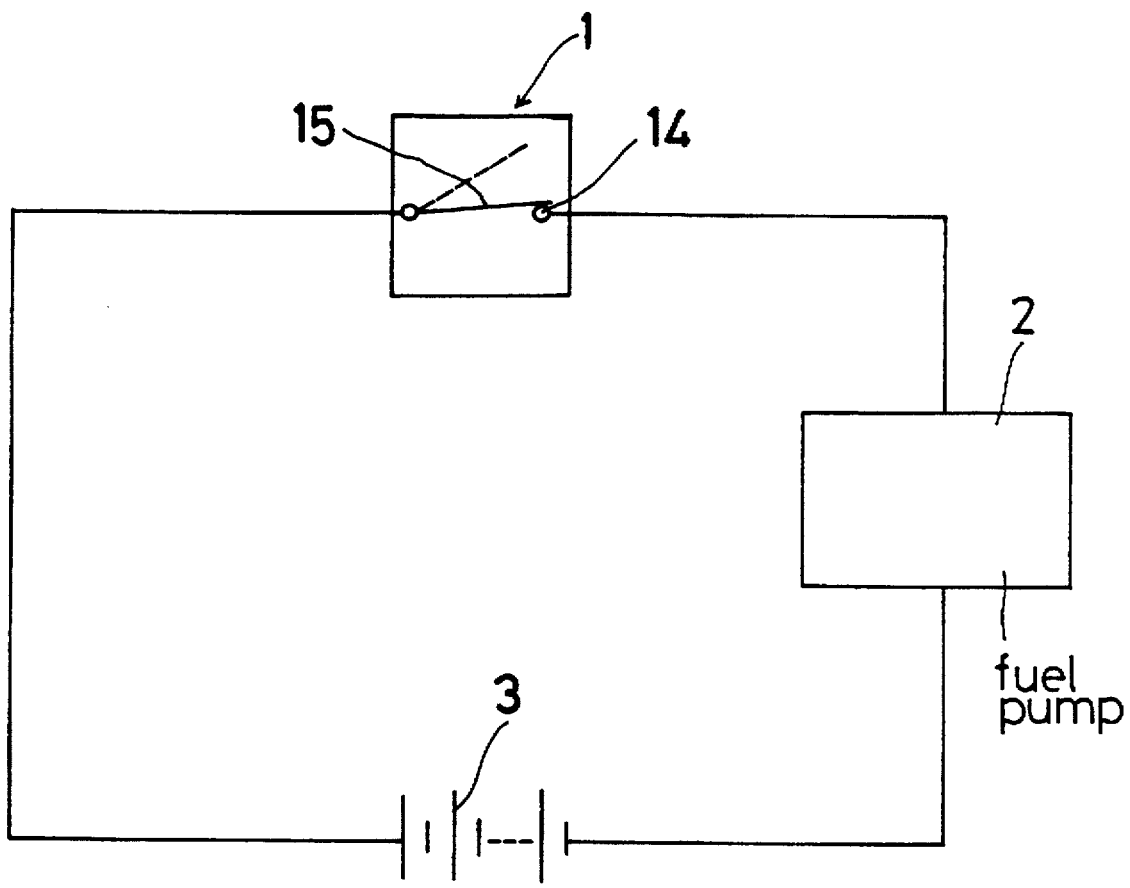
FIG. 1 is a schematic illustration of how the shock sensor is connected to a fuel pump.

FIG. 1 schematically shows the shock sensor 1 of the present invention connected to a fuel pump 2. The shock sensor 1 is mounted in an appropriate place in a vehicle and is adapted to quickly sense the shock resulting from a vehicle collision or other similar event. When the shock sensor 1 senses the occurrence of a shock greater than a predetermined level, the shock sensor 1 delivers a signal to the fuel pump 2. The fuel pump 2 receives a signal from the shock sensor 1 and stops supplying fuel to the engine to thereby prevent the engine from burning. The shock sensor 1 and pump 2 are electrically connected to a battery 3.

Figure 2:
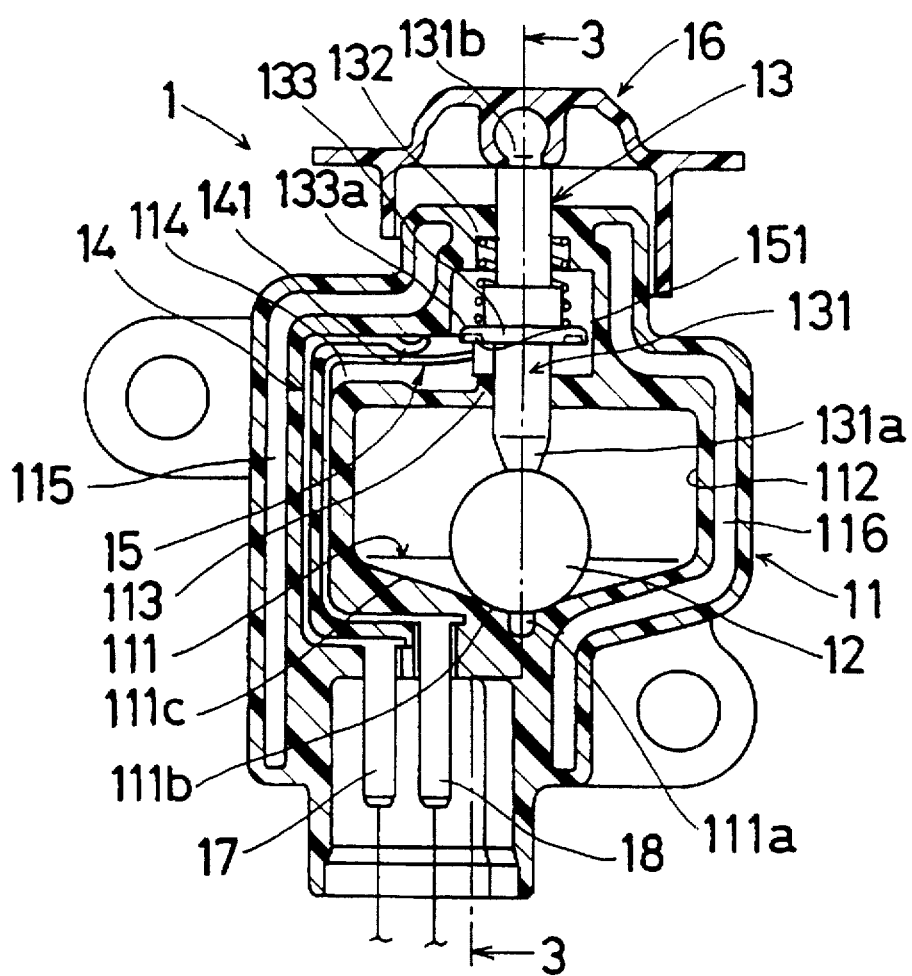
FIG. 2 is a cross-sectional view of the shock sensor according to one embodiment of the present invention.
Figure 3:
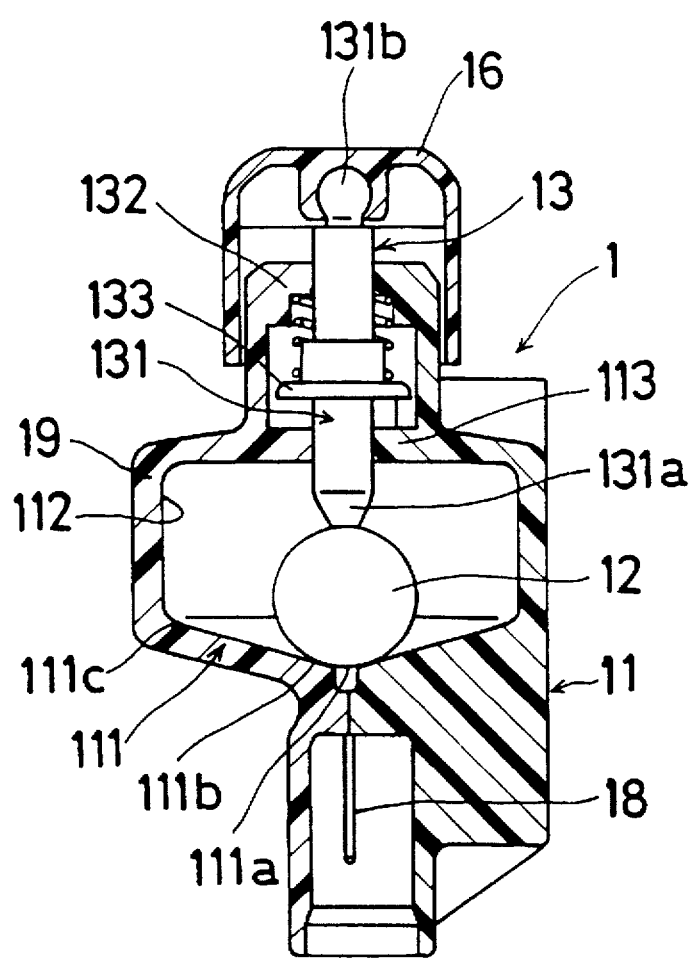
FIG. 3 is a cross-sectional view of the shock sensor taken along the section line 3—3 in FIG. 2.

With reference to FIG. 2, the shock sensor 1 of the present invention includes a housing 11, a ball 12 positioned in the housing 11, a supporting member 13 disposed in the housing 11, a fixed electrode 14 located in the housing 11, a movable electrode 15 positioned in the housing, and a reset member 16 located at the top portion of the housing 11.

A relatively large chamber or enclosed area 112 is formed in the center of the housing 11 and is provided with downwardly sloping bottom wall 111. The downwardly sloping wall 111 forms a conically shaped bottom portion of the chamber 112. The sloping wall 111 includes a bottom 111a, a first sloping portion 111b, and a second sloping portion 111c. The first sloping portion 111b is directly connected to the bottom 111a and extends in an annular manner about the bottom 111a. The second sloping portion 111c is directly connected to the first sloping portion 111b and extends in an annular manner about the first sloping portion 111b. As illustrated in FIG. 2, for example, the second sloping portion 111c is longer than the first sloping portion 111b (i.e., as viewed in cross-section, the second sloping portion 111c is longer than the first sloping portion 111b).

Figure 5:
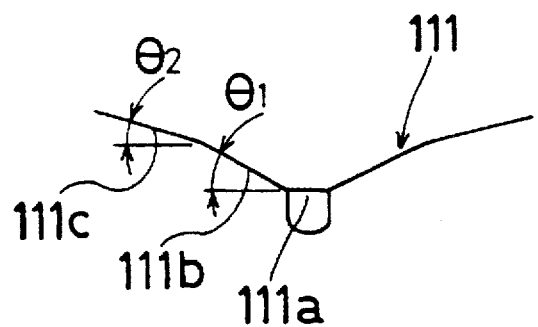
FIG. 5 is a side view of a portion of the shock sensor illustrating one example of the shape of the sloping wall.
Figure 6:
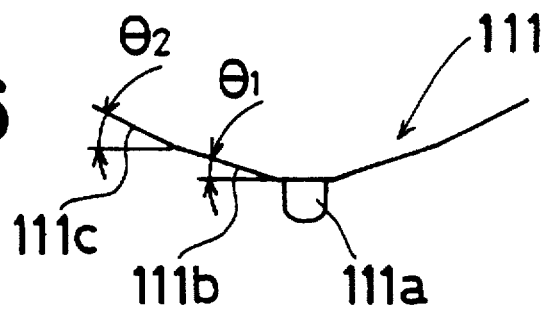
FIG. 6 is a side view of a portion of the shock sensor illustrating another example of the shape of the sloping wall.

As can be seen from FIG. 5, the first sloping portion 111b and the second sloping portion are both angled with respect to a horizontal reference line. The angle of inclination θ1 of the first sloping portion 111b is greater than the angle of inclination θ2 of the second sloping portion 111c. As shown in FIG. 6, which represents another alternative arrangement, the angle of inclination θ1 of the first sloping portion 111b can be less than the angle of inclination θ2 of the second sloping portion 111c. It is also possible to make the angles of inclination for the first and second sloping portions 111b, 111c the same or substantially the same.

Referring back to FIG. 2, the ball 12 is disposed in the chamber 112 and is adapted to normally assume a position at the bottom 111a of the sloping wall 111. The ball 12 moves up the sloping wall 111 away from the position shown in FIG. 2 when a shock greater than a predetermined level or threshold is applied. Since the sloping wall 111 defines a generally conical bottom wall, the ball 12 can move in any direction and, as a result, can sense a shock from any side.

The supporting member 13 is adapted to push the ball 12 against the bottom portion 111a of the sloping wall 111. Thus, the supporting member 13 maintains the ball 12 in the neutral position illustrated in FIG. 2 in the absence of a shock exceeding the certain level.

The supporting member 13 includes a rod 131 and a spring or pressing member 132 that urges the rod downwardly towards the sloping wall 111. The rod 131 is vertically oriented in the chamber and is held by the housing 11 so that it can move axially in the vertical direction. The rod 131 includes a bottom end 131a and a top end 131b. The bottom end 131a of the rod 131 extends into the chamber 112 and engages the ball 12 as long as a shock over a certain level is not applied. The top end 131b of the rod 131 extends out of the housing 11 and is engaged by the reset member 16. The top end 131b of the rod 131 is preferably circular in cross-section as shown in FIG. 2 to engage a correspondingly shaped portion of the reset member 16.

Figure 4:
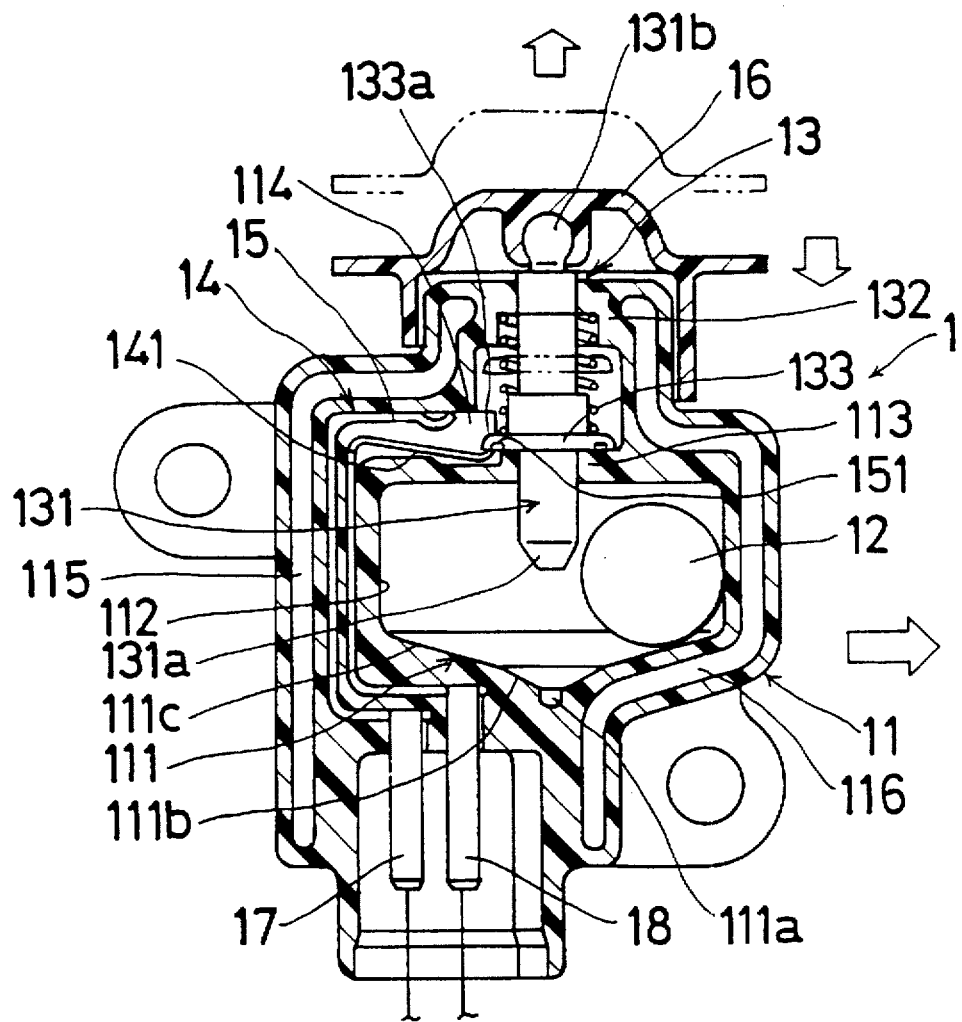
FIG. 4 is a cross-sectional view similar to FIG. 2 illustrating the shock sensor when a shock is applied.

As seen in FIG. 2, the rod 131 is provided with an integrally formed spring retainer 133. The spring 132 that urges or presses the rod 131 downwardly is disposed between the retainer 133 and the housing 11. As shown in FIG. 4, the retainer 133 engages a housing wall 113 after the rod has undergone a certain amount of axial movement. The retainer 13 and the housing wall 113 thus function as a stopper for restricting the extent of downward movement of the rod 131.

The construction of the shock sensor of the present invention is advantageously designed so that a single urging or pressing member 32 performs two functions. In one respect, the urging member 132 partially functions as the supporter of the ball 12 by pushing the rod 131 against the ball 12 when a shock greater than a certain level is not applied. In addition, as described below in more detail, the urging member 132 also functions as a switch that changes the state of the movable and fixed electrodes 14, 15. This reduces the number of parts as well as the manufacturing costs associated with the shock sensor.

Figure 7:
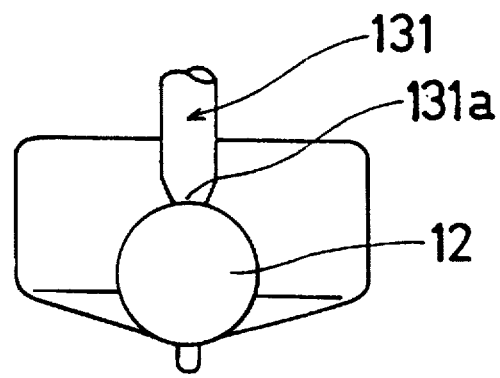
FIG. 7 is a side view of a portion of the shock sensor illustrating one example of the shape of the bottom end of the rod.
Figure 8:
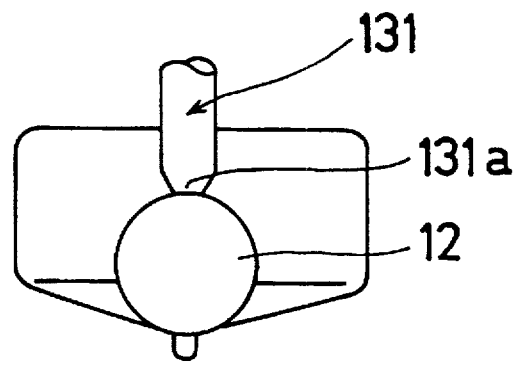
FIG. 8 is a side view of a portion of the shock sensor illustrating another example of the shape of the bottom end of the rod.
Figure 9:
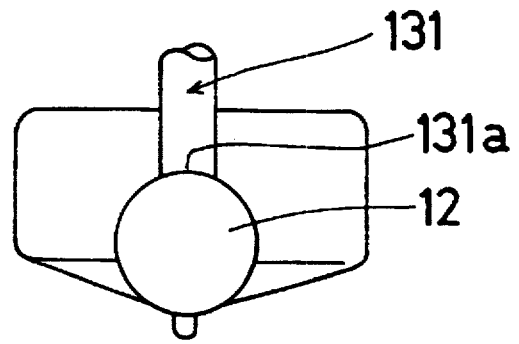
FIG. 9 is a side view of a portion of the shock sensor illustrating yet another example of the shape of the bottom end of the rod.

As shown in FIG. 7, the region of contact between the ball 12 and the engagement surface at the bottom end 131a of the rod 131 is spherical and the contact area is relatively small. It is understood, however, that the shape of the contact region could be flat as generally depicted in FIG. 8. Alternatively, instead of providing the bottom end 131a of the rod with a somewhat tapering or conical profile as shown in FIG. 7, the shape of the contact area can be spherical with a relatively larger contact area as shown in FIG. 9. This can be achieved by eliminating the tapering or conical profile at the bottom end 131a of the rod 131. If the contact region is spherical as in FIGS. 7 and 9, the ball 12 is typically not released by a single quick shock, but rather is released with a generally more continuous or ongoing shock. If the contact region is flat as shown in FIG. 8, the ball 12 can be released by a generally quick or instantaneous shock, thereby exhibiting a generally quicker response time.

A relatively small chamber 114 is formed in the housing 111 and is disposed outside the relatively larger chamber 112. The fixed electrode 14 is disposed within the small chamber 114 and is connected to a terminal 17. The fixed electrode 14 is electrically connected to the battery 3 and the fuel pump 2 depicted in FIG. 1 by way of the terminal 17. The electrode 14 fixed in the housing 11 is provided on its edge with a protruding part 141 which protrudes downwardly in the manner shown in FIG. 2. The protruding part 141 can be made suitably thick so as not to be elastic, or it can be made suitably thin so that it exhibits elastic characteristics.

A movable electrode 15 is also disposed in the small chamber 114 in facing relation to the fixed electrode 14. The movable electrode 15 is preferably made of elastic material so that it is flexible. The movable electrode 15 is connected to a terminal 18 so that the movable electrode is electrically connected to the battery 3 shown in FIG. 1 by way of the terminal 18. One end 151 of the movable electrode 15 engages an annular recess 133a that is formed in the retainer 133. Thus, the movable electrode 15 moves with the rod 131 as a single unitary member.

The movable electrode 15 is adapted to be electrically connected to and electrically disconnected from the deformed or protruding tip 141 of the fixed electrode 14 according to the position of the rod 131. In the position shown in FIG. 2 in which a shock greater than a predetermined level is not applied, the fixed electrode 14 and the movable electrode 15 are connected to each other. On the other hand, the application of a shock greater than the predetermined level results in movement of the ball 12 away from the position shown in FIG. 2, downward axial movement of the rod 131, and disconnection of the movable electrode 15 from the fixed electrode 14.

As briefly mentioned above, the spring 132 is adapted to push the rod 131 downwardly and change the state of the electrodes 14, 15 when the ball 12 is released from engagement with the rod 131. The spring 132 also maintains the state of both electrodes 14, 15 after a shock is sensed. That is, when a shock greater than the predetermined level occurs, the ball 12 moves away from its location at the bottom 111a of the sloping wall 11 and so the rod 131 moves axially downward. The spring 132 maintains the rod 131 in the axially downwardly displaced position. In this way, the spring 132 maintains the disconnection between the electrodes 14, 15 after a shock is sensed to thereby ensure sufficient time to detect a shock while also ensuring that the electrodes 14, 15 do not inadvertently become once again connected.

As mentioned above, the reset member 16 is positioned at the upper end of the housing 11 and is connected to the top end 131b of the rod 131. The reset member 16 is adapted to restore the movable and fixed electrodes 14, 15 from the disconnected state shown in FIG. 4 to the connected state shown in FIG. 2. In particular and as schematically illustrated in FIG. 4, the reset member 16 is adapted to be pulled manually upwardly in the direction of the arrow to restore the connected state of both electrodes 14, 15.

The shock sensor is also provided with a cover 19 that is adapted to be connected to the housing 11. The housing 11 is provided with several chambers 115, 116 into which are inserted projections (not specifically shown) formed on the cover 19. The insertion of the projections into the chambers 115, 116 allows the cover 19 to be connected to the housing 11.

Having described the features associated with the shock sensor of the present invention, the manner of operation of the shock sensor is as follows.

As shown in FIG. 2, in the absence of a shock greater than a predetermined amount, the ball 12 stays generally still at the bottom 111a of the sloping wall 111 and the supporting member 13 pushes against the ball 12. In this position, the movable electrode 15 is connected to the fixed electrode 14 in the manner shown in FIG. 2. Thus, the rod 131 is maintained by the ball 12 in a position which ensures the connection between the fixed electrode 14 and the movable electrode 15. In this position, the fuel pump 2 is able to operate.

When a shock greater than a predetermined level is applied to the shock sensor, such as that which might occur during a collision of the vehicle, the ball 12 moves away from the position shown in FIG. 2 and moves up the sloping wall 111 as shown in FIG. 4. This movement of the ball 12 pushes the rod 131 axially upward. When the ball reaches the second sloping portion 111c of the sloping wall 111, the ball 12 is released from the rod 131. As the ball moves up the second slope 111c, the spring 132 pushes the rod 131 axially downward. Since the movable electrode 15 moves with the rod 131, the downward movement of the rod 131 also causes the movable electrode to move downwardly. As a result, the movable electrode 15 becomes electrically disconnected from the fixed electrode 14 and so the fuel pump 2 is turned off.

As mentioned above, the bottom portion of the housing includes a bottom end 111a where the ball 12 is positioned in the absence of a shock, a first sloping portion 111b that is contiguous to the bottom 111a, and the second sloping portion 111c that is contiguous to the first sloping portion 111b, with the second sloping portion 111c having a different angle of inclination that the first sloping portion 111b. The angle of inclination of the first sloping portion 111b sets the level of shock which releases the ball 12 from the rod 131. If the angle of inclination of the second sloping portion 111c with respect to the horizontal is smaller than that of the first sloping portion 111b, the ball 12 reliably or surely rolls up to the top once a shock exceeding a certain level set by the first sloping portion 111b occurs and the ball 12 is released from the rod 131. On the other hand, if the angle of inclination of the second sloping portion 111c with respect to the horizontal is larger than that of the first sloping portion 111b, the ball 12 is able to reliably return to its initial position at the bottom 111a of the sloping wall 111 when the reset member 16 is pulled upwardly.

As mentioned above, when the shock sensor senses a shock greater than a certain level to effect a disconnection between the movable and fixed electrodes, a signal is sent to the fuel pump to turn the fuel pump off. However, the vehicle must be moved after a shock is sensed to avoid secondary vehicle accidents or to have the vehicle repaired, but the vehicle cannot be driven as long as the fuel pump is turned off. As shown in FIG. 4, the rod 131 pushed to the bottom interferes with the ability of the ball 12 to move downwardly to the bottom end 111a of the housing. Therefore, the shock sensor must be restored after a shock has been sensed. This is the function of the reset member 16.

When the reset member 16 is manually pulled up, the rod 113 moves upward against the biasing force of the spring 132. This causes the movable electrode 15 to once again be connected to the fixed electrode 14 so that the fuel pump 2 is turned on. At the same time, the ball 12 moves down the sloping portions 111c, 111b of the sloping wall 111 and returns to its initial position at the bottom 111a of the sloping wall 111. When the reset member 16 is subsequently released, the spring 132 pushes the rod 131 downwardly against the ball 12 to maintain the ball 12 at the bottom 111a of the sloping wall 111.

In the above described preferred embodiment, the electrodes 14, 15 are disconnected from one another when a shock is applied. It is understood, however, that the position of the fixed electrode 14 can be changed so that the electrodes 14, 15 are connected when a shock is given. In addition, although the shock sensor has been described above in the context of rendering a fuel pump non-operational, it is to be understood that the sensor is not restricted to this use. The shock sensor can be used in other contexts where shock sensors are employed such as air bags that respond to head-on and lateral collisions, and to unlock door locks.

Figure 10:
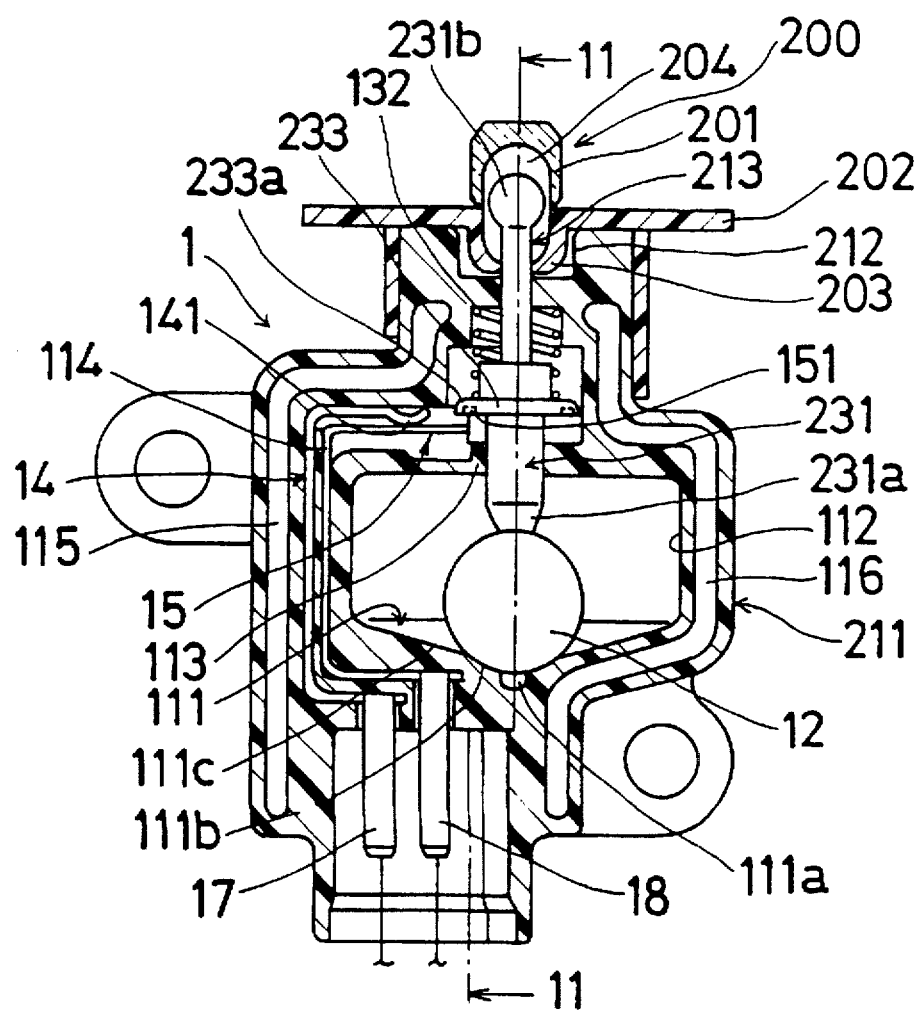
FIG. 10 is a cross-sectional view similar to FIG. 2 illustrating sensor according to a second embodiment of the present invention.
Figure 11:
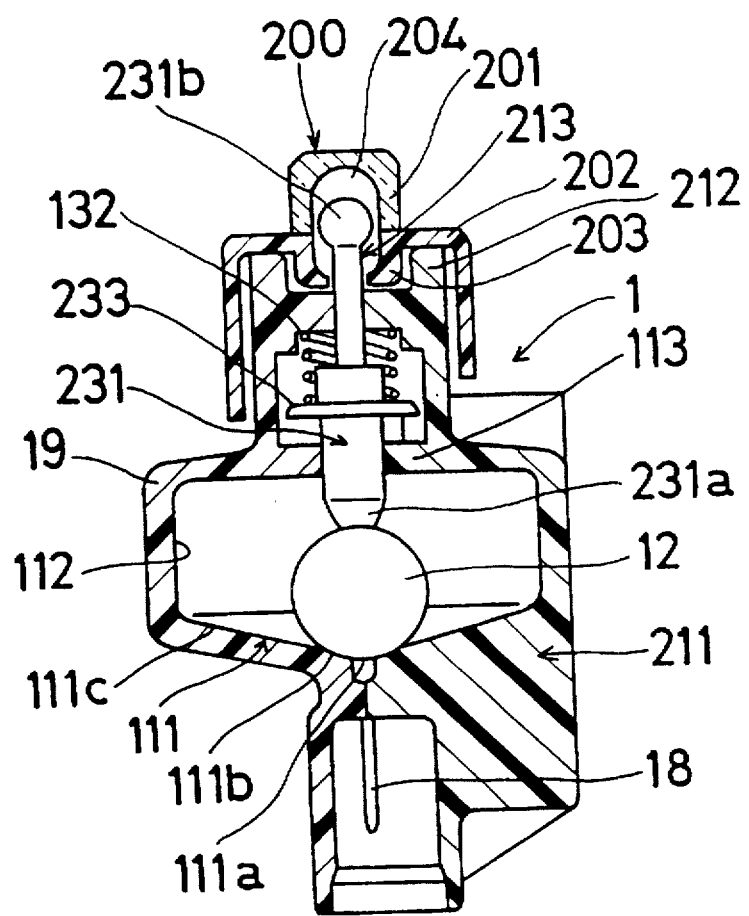
FIG. 11 is a cross-sectional view of the shock sensor taken along the section line 11—11 in FIG. 10.
Figure 12:
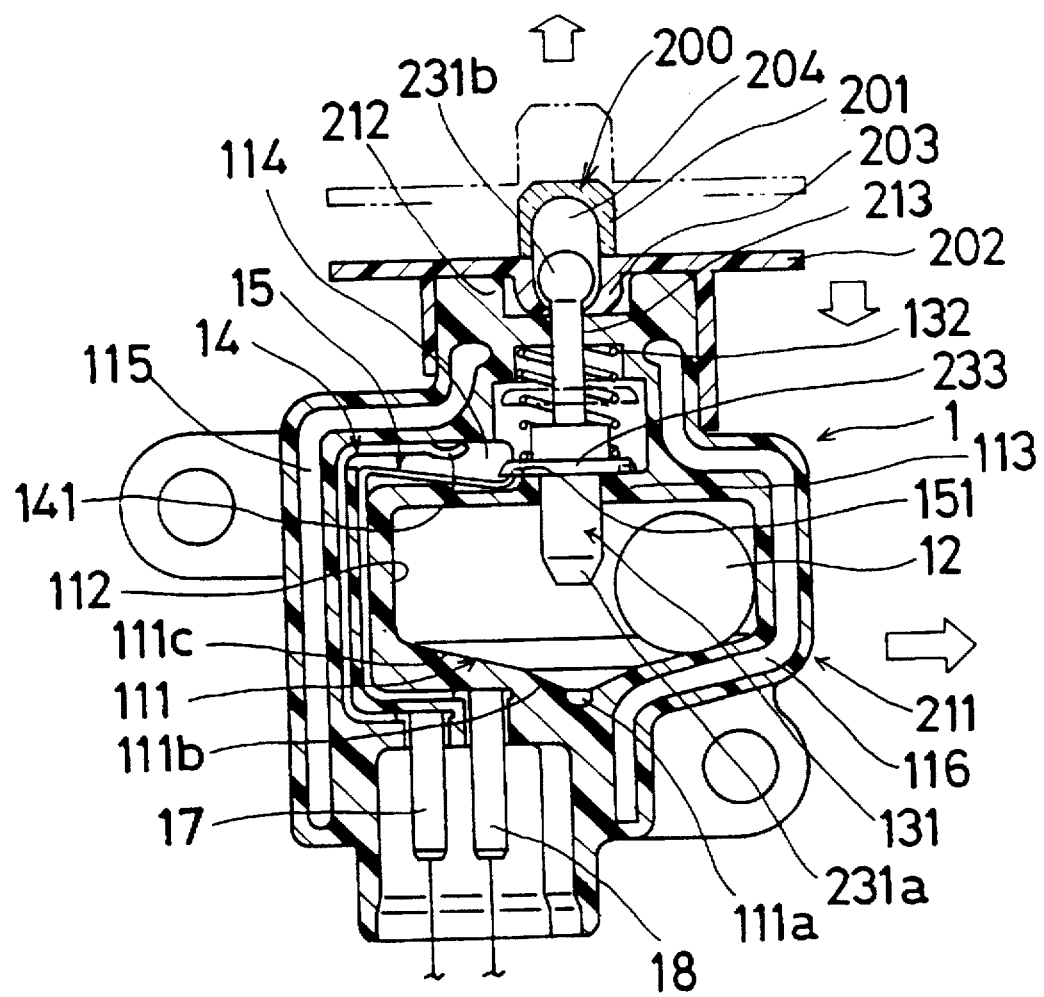
FIG. 12 is a cross-sectional view similar to FIG. 10 illustrating the shock sensor when a shock is applied.

FIGS. 10-12 illustrate a second embodiment of the shock sensor according to the present invention. Features of the shock sensor according to the second embodiment that are the same as those associated with the first embodiment of the shock sensor are identified with reference numerals that correspond to the reference numerals used in connection with the description of the first embodiment. Generally speaking, the second embodiment of the shock sensor illustrated in FIGS. 10-12 differs from the first embodiment of the shock sensor with respect to features relating to the reset member 200, the configuration of the housing 211, and the supporting member 231.

With reference initially to FIGS. 10 and 11, the reset member 200 is particularly constructed to function as an indicator that indicates or identifies whether or not the movable and fixed electrodes are connected to one another. In this regard, the reset member 200 is provided with a base member 202 and a cap 201 that is attached to the center of the base member 202 and extends upwardly away from the base member 202. The cap 201 is made of transparent or semi-transparent material so that the cap 201 can function as a window.

The base member 202 is also provided with a concave portion 203 that extends in a direction opposite the direction of extension of the cap 201. The combination of the concave portion 203 and the cap 201 forms an oblong space or enclosure 204 that is vertically oriented in the direction of axial movement of the rod 213. The oblong or elongated space 204 is formed within the reset member 200. The top end 231b of the rod 213 is adapted to move in the elongated or oblong space 204.

The top portion of the housing 211 is provided with a concave or recessed portion 212. The lower part of the elongated space 204 is enveloped or encircled by the concave portion 212 of the housing 211 when the reset member 200 is positioned in the upper end of the housing 211.

The supporting member 213 includes a rod 231 and a retainer 233. The retainer 233 is provided with an annular recess 233a that receives and is connected to one end of the movable electrode 151. The top end 231b of the rod 231 is shaped in the form of a ball with a circular cross-section.

As illustrated in FIG. 10, when the movable electrode 15 and the fixed electrode 14 are connected to one another, the top end 231b of the rod 213 is visually apparent in the convex upper portion of the elongated space 204 through the transparent cap 201. To help facilitate visual observation of the top end 231b of the rod 231, the top end 231b can be painted with a visually distinctive color (e.g., red).

FIG. 12 illustrates the shock sensor once a shock exceeding a predetermined level has been applied. As described above, when the ball 12 moves away from the bottom 111a upon the sensing of a shock, the support member 213 moves downwardly under the urging force of the spring 132. The shock sensor then takes the position illustrated in FIG. 12. In this position, the top end 231b of the rod 231 is hidden or visually obscured in the concave part 213. As a result, the top end 231b of the rod 231 is not readily seen from outside. In the second embodiment described above and illustrated in FIGS. 10-12, the electrodes 14, 15 can be restored to the connected state from the unconnected state by manually pulling up the reset member 200. Once the reset member 200 is pulled upwardly, the fixed electrode 14 and the movable electrode 15 will once again be connected. At this point the reset member 200 will have to be pushed downwardly a slight distance so that the reset member 200 contacts the housing 211. As a result, the top end 231b of the supporting member rod 231 will appear in the window defined by the transparent cap 201.

As described, the shock sensor in accordance with the present invention is quite advantageous with respect to other types of shock sensors in that it requires less parts. In at least one respect, it is not necessary to provide separate springs for biasing each of several movable electrodes. Also, the cost associated with manufacturing the shock sensor is less than other types of shock sensors since, for example, it is not necessary to form a groove in the outer periphery of the axially movable rod. Since the movable electrode 15 is operatively associated with the rod 231, the downward movement of the rod 231 upon the sensing of a shock exceeding a predetermined level causes the movable electrode to become disconnected from the fixed electrode 15. Thus, the spring which biases the rod the downward direction also functions as a mechanism for effecting disconnection between the electrodes 14, 15 upon the sensing of a shock.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A shock sensor comprising:

a housing having a conically shaped bottom portion that converges to a bottom end;

a ball positioned in the housing and movable along the conically shaped bottom portion of the housing when a shock exceeding a predetermined level is applied to the shock sensor;

a supporting member movably mounted in the housing for pushing the ball against the bottom end of the conically shaped bottom portion of the housing in the absence of a shock exceeding the predetermined level and for being separated from the ball to release the ball when a shock exceeding the predetermined level is applied to the shock sensor;

an elastic member disposed between the housing and the supporting member for biasing the supporting member against the ball:

a fixed electrode fixed within the housing; and a movable electrode connected to and movable with the supporting member so that with the supporting member in one position the fixed electrode and the movable electrode are connected to one another to define a connected state and with the supporting member in another position the fixed electrode and the movable electrode are disconnected from one another to define a disconnected state.

2. A shock sensor as claimed in claim 1, including a reset member mounted on the housing and connected to the supporting member for manually moving the movable electrode from the disconnected state to the connected state.

3. A shock sensor as claimed in claim 1, wherein said supporting member includes a rod having a bottom end that engages said ball and a pressing member that pushes the rod against the ball in the absence of a shock exceeding a predetermined level, said pressing member pushing the rod toward the bottom end to switch said movable and fixed electrodes from the connected state to the unconnected state when the rod is released from engagement with the ball upon application of a shock exceeding the predetermined level.

4. A shock sensor as claimed in claim 3, wherein said pressing member maintains the unconnected state of the movable electrode and the fixed electrode after a shock exceeding the predetermined level is sensed.

5. A shock sensor as claimed in claim 1, wherein the conically shaped bottom portion includes a first sloping portion and a second sloping portion, the first sloping portion being located between the bottom end and the second sloping portion, the first sloping portion being inclined at an angle of inclination that is different from an angle of inclination of the second sloping portion.

6. A shock sensor as claimed in claim 1, including an indicator for indicating whether or not the movable electrode is connected to the fixed electrode.

7. A shock sensor as claimed in claim 1, wherein said indicator includes an elongated space enclosed by a cap, said supporting member having an upper end located in the elongated space and visible through the cap when the movable electrode and fixed electrode are connected to one another.

8. A shock sensor as claimed in claim 7, wherein said cap is at least partially transparent.

9. A shock sensor for sensing the occurrence of a shock that exceeds a predetermined level, comprising:

a housing having an interior partially bounded by a sloping bottom wall that converges to a bottom end;

a ball disposed in the housing, the ball being positionable at the bottom end of the housing in the absence of a shock exceeding the predetermined level and being movable away from the bottom end of the housing upon the occurrence of a shock exceeding the predetermined level;

a rod movably mounted in the housing in an axial direction of the rod;

a fixed electrode mounted in the housing;

a movable electrode positioned in the housing, said movable electrode being connectable to the fixed electrode in the absence of a shock exceeding the predetermined level and being disconnectable from the fixed electrode upon the occurrence of a shock exceeding the predetermined level;

a spring positioned between the housing and the rod and operatively associated with the movable electrode for urging the rod into engagement with the ball in the absence of a shock exceeding the predetermined level and for urging the movable electrode out of connection with the fixed electrode upon movement of the ball away from the bottom end in response to the occurrence of a shock exceeding the predetermined level.

10. A shock sensor as claimed in claim 9, including visual indicator means for providing a visual indication of whether the movable electrode is connected to or disconnected from the fixed electrode.

11. A shock sensor as claimed in claim 10, wherein said visual indicator means includes a cap located at an upper end of the housing, the cap being made of at least partially transparent material and enclosing an elongated space, a portion of the rod being disposed in the elongated space.

12. A shock sensor as claimed in claim 9, including a spring retainer mounted on the rod, said spring applying an urging force to the rod by way of the spring retainer.

13. A shock sensor as claimed in claim 12, wherein the movable electrode engages the spring retainer.

14. A shock sensor as claimed in claim 9, including a manually operable reset member mounted at an upper end of the housing for resetting the shock sensor from a disconnected state in which the movable electrode is disconnected from the fixed electrode to a connected state in which the movable electrode is connected to the fixed electrode.

15. A shock sensor for sensing the occurrence of a shock that exceeds a predetermined threshold comprising:

a housing having a sloping bottom wall that converges to a bottom end;

a ball positioned in the housing and movable away from the bottom end of the housing upon the occurrence of a shock exceeding a predetermined threshold;

a supporting member movably mounted in the housing for pushing the ball against the bottom end of the housing in the absence of a shock exceeding the predetermined threshold and for being separated from the ball to release the ball when a shock exceeding the predetermined level is applied to the shock sensor;

an elastic member disposed between the housing and the supporting member for biasing the supporting member against the ball;

a fixed electrode fixed within the housing;

a movable electrode movably positioned within the housing for movement between one position in which the fixed electrode and the movable electrode are connected to one another to define a connected state and another position in which the fixed electrode and the movable electrode are disconnected from one another to define a disconnected state; and a cap positioned at an upper end of the housing and enclosing a space in which is located an end portion of the supporting member, the cap being made of at least partially transparent material so that the end portion of the supporting member is visually observable through the cap when the fixed electrode and the movable electrode are either in the connected state or the disconnected state.

16. A shock sensor as claimed in claim 15, including a reset member mounted on the upper end of the housing for manually moving the movable electrode from the disconnected state to the connected state.

17. A shock sensor as claimed in claim 16, wherein the upper end of the supporting member is positioned in a recess provided in the reset member, the cap covering the recess so that the space enclosed by the cap is elongated in the direction of movement of the supporting member.

18. A shock sensor as claimed in claim 15, wherein the movable electrode is connected to the supporting member so that the movable electrode moves with the supporting member.

* * * * *

UNITED STATES PATENT AND TRADEMARK OFFICE
CERTIFICATE OF CORRECTION

PATENT NO. : 5,747,761
DATED : May 5, 1998
INVENTOR(S) : Soichiro MASUDA

It is certified that error appears in the above-indentified patent and that said Letters Patent is hereby corrected as shown below:

Title page item [54] and column 1, lines 1 and 2 should read
-- SHOCK SENSOR SWITCH WITH HOUSING HAVING BOTTOM WALL CONVERGING TO BOTTOM END AND BALL DISPOSED IN HOUSING Signed and Sealed this Eighteenth Day of August, 1998

*Attest:*

BRUCE LEHMAN

*Attesting Officer*        Commissioner of Patents and Trademarks